Oct. 31, 1972  J. J. FERNANDEZ  3,701,592

VACUUM SPECTACLE BRIDGE

Filed Oct. 1, 1971  2 Sheets-Sheet 1

INVENTOR.
JOSE J. FERNANDEZ
BY
Lloyd Andrew

Oct. 31, 1972     J. J. FERNANDEZ     3,701,592

VACUUM SPECTACLE BRIDGE

Filed Oct. 1, 1971     2 Sheets-Sheet 2

INVENTOR.
JOSE J. FERNANDEZ
BY
Lloyd Andres

United States Patent Office 3,701,592
Patented Oct. 31, 1972

3,701,592
VACUUM SPECTACLE BRIDGE
Jose J. Fernandez, 430 NE. 29th St.,
Miami, Fla. 33137
Filed Oct. 1, 1971, Ser. No. 185,786
Int. Cl. G02c 5/02
U.S. Cl. 351—130     3 Claims

ABSTRACT OF THE DISCLOSURE

A pair of spectacles provided with a nose bridge specifically contoured to conform to the upper nose of the wearer with a central portion of the bridge made from plastic or metal alloy material including a U shaped cavity forming a vacuum around a portion of the nose for retaining the spectacles in their normal position. The spectacles are attached by modest pressure at the bridge without the deforming permanent pressure of the pince-nez type bridge and without the well known ear bows. This invention also includes the process of manufacture for custom fitting to each wearer.

---

This invention relates in general to spectacles and more particularly to a bridge structure including a vacuum retaining means for holding the spectacles on the wearer's nose.

Prior spectacles required the use of bows for engaging the side of the head or the ears, which are undesirable in appearance, uncomfortable to the wearer and often interfere with wide range of sight. Furthermore, the pince-nez type of spectacles provide concentrated spring pressed pads on opposite sides of the upper nose, which reduces blood circulation and is irritating to the user and continued use results in disfigurement of the tissue above and between the eyes.

The present invention overcomes the above objections and difficulties by the provision of a bridge structure for spectacles which include a U shaped area for vacuum contact with a portion of the upper nose including an area on each side thereof, which is not uncomfortable and does not hamper blood circulation and is relatively inconspicuous.

A further object of the invention provides for the simple manual placement and removal of the spectacles, as well as the use of a relatively simple storage case.

These and other objects and advantages in one embodiment of the invention are described and shown in the following specification and drawings, in which.

Figure 1:
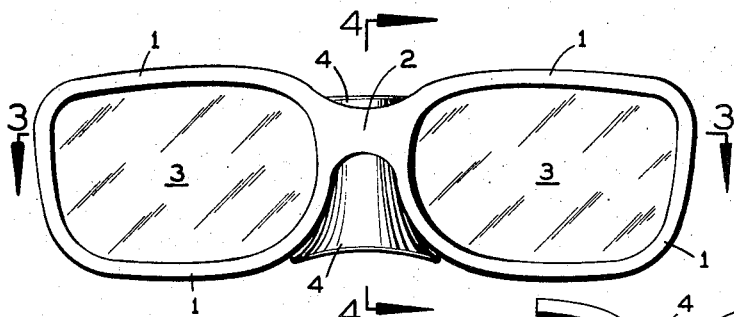
FIG. 1 is a front elevation of a pair of spectacles with plastic frame including a vacuum bridge.
Figure 2:
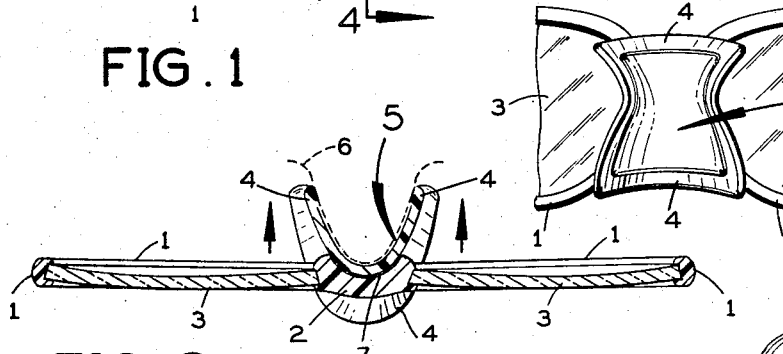
FIG. 2 is a fragmentary rear elevation of the spectacles shown in FIG. 1.

Referring to FIGS. 1 and 2, a pair of spectacles, made of one of the many molded plastic types, includes an integral bridge 2 and is adapted and constructed to retain lenses 3—3, as shown. A vacuum holder 4, made of selected material, such as one of the acrylic polymer plastics, is secured by means to be hereinafter described on the inner side of the bridge and the central portions of the frame 1.

FIG. 2 illustrates the vacuum recess 5 in the rear side of the vacuum holder 4. The top upper portion and the side upper portion of a human nose 6 is illustrated in dotted lines in FIGS. 3 and 4, respectively.

Although the vacuum holder 4 may be made integral with the bridge of plastic framed spectacles, the problem of an exact airtight fit of the bridge suggests that the entire frame be custom-made, which presents a high cost compared with the vacuum attachment.

Figure 3:
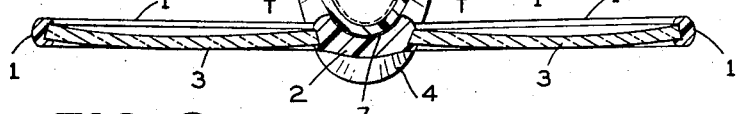
FIG. 3 is a cross sectional top plan view taken through section line 3—3, FIG. 1.

The cross sectional view, FIG. 3, shows the vacuum holder 4 secured to the inside arcuate surface of the bridge 2 by an adhesive 7, such as an epoxy material, with the inner surface of a pre-fitted vacuum holder accurately fitted to both sides and front of the upper nose 6 by the application of modest pressure in the direction shown by arrows, which will remove the air from the recess 5, shown in FIG. 2, and permit atmospheric pressure to hold the holder 4 and the spectacles to the nose.

Figure 4:
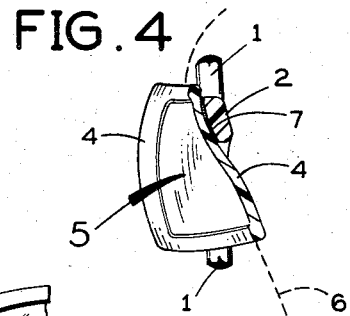
FIG. 4 is a cross sectional side view taken through section line 4—4, FIG. 1.

FIG. 4 shows a cross sectional side view of the recess 5 in a vacuum holder 4 secured to the upper portion of the nose 6 which provides a vacuum bond between the holder 4 and the surface of the nose sufficient to hold the spectacles in proper position without discomfort. The vacuum bond is fortified by the sealing effect of the natural oils present in the nose tissue.

Figure 5:
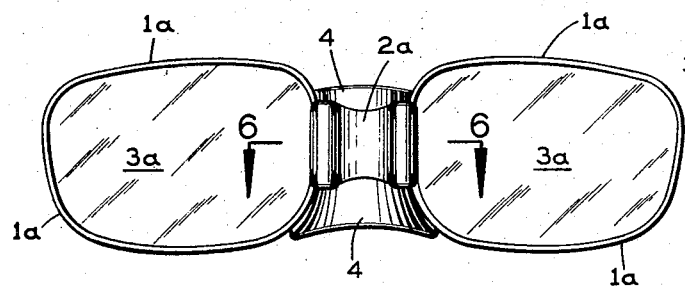
FIG. 5 is a front elevation of an alternate form of spectacles with a metal frame including a vacuum bridge.
Figure 6:
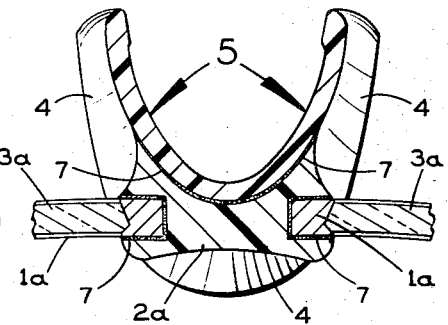
FIG. 6 is a fragmentary enlarged top cross sectional view taken through section line 6—6, FIG. 5.

FIGS. 5 and 6 illustrate an alternate form of spectacles 1a having metal rims which are secured in a bridge 2a by the use of an adhesive, which adhesive likewise serves to hold the vacuum holder 4 to the bridge 2a by the mating arcuate surfaces, as shown in FIG. 6. It is to be noted that when the spectacles are applied to the upper nose, as illustrated in FIGS. 3 and 4, and under the assumption that the inner contour of the holder accurately is mated to the shape of the particular nose with which the spectacles are to be used, then the air will be displaced from the recess 5 by modest pressure against the bridge and sufficient evacuation of the recess 5 will be obtained to permit normal atmospheric pressure against the outside of the vacuum holder to support the spectacles upon the nose against all normal vibration or shock forces.

Figures 7, 8:
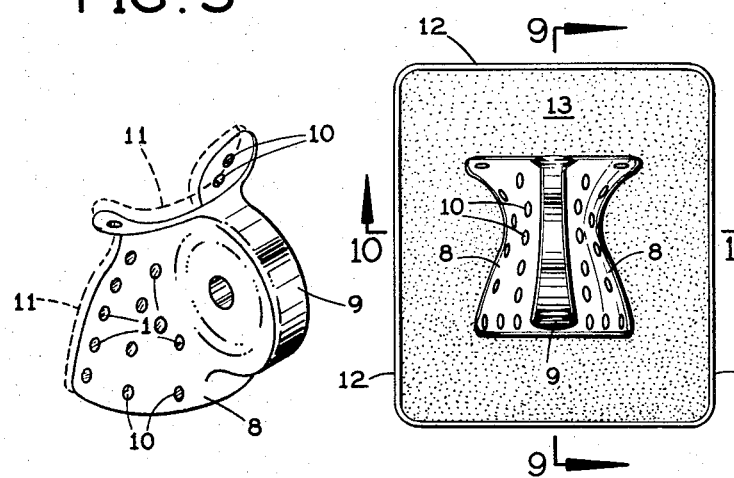
FIG. 7 is a perspective external view of a manually operated impression holder for making a personal impression of the upper portion of the nose of the wearer showing the impression material in dotted lines, which material is used in the first step of the molding process.
FIG. 8 is a plan view of a mold container for retaining a quantity of molding material with the impression holder in molding position, which is a second step in the process.

Referring to FIG. 7, the process for producing the holder for the spectacles begins with the construction of an impression fixture 8 having an open side conforming to a normal size of the upper nose, which includes a central handle 9 for thumb and forefinger and a plurality of holes 10 through the wall for reasons to be hereinafter described.

For making a precise impression of the upper nose, a layer of substantially uniform soft impression compound 11, such as Hydrocoloid or Alginate, is applied to the inner surface of the fixture and the handle 9 thereof held between the thumb and forefinger and uniformly pressed against the upper portion of the nose, which will form an arcuate impression in the material of the particular nose shape of the person being fitted and force small projections of the impression material through the holes therein and thus secure the nose impression to the inner surface of the fixture.

Figure 9:
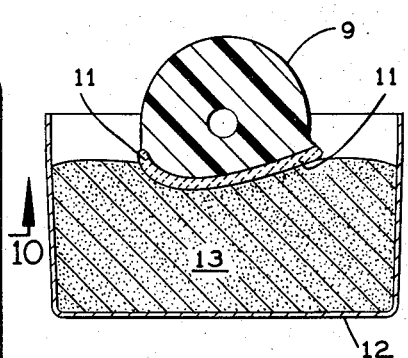
FIG. 9 is a cross sectional side elevation taken through section line 9—9, FIG. 8.
Figure 10:
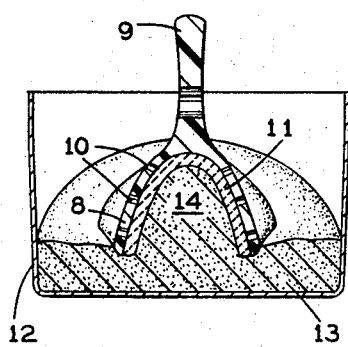
FIG. 10 is a cross sectional end elevation taken through section line 10—10, FIG. 8.

A soft mixture of finely divided self-setting pliable molding plaster 12, commonly known as dental stone, is placed in a rectangular container 13 and the top area of the plaster smoothed. This part of the molding flask is commonly known as the drag. While the plaster or stone is in the soft state, the impression of the nose portion in the fixture 8 is coated with a light layer of parting material, such as Jeltrate, and manually pressed into the top area of the plaster 12 forming a depression mating the original impression of the fixture 9, as shown in FIGS. 8, 9, and 10.

The impression fixture and the impression are now carefully removed from the drag portion of the mold exposing a negative replica 14 of the upper part of the nose.

For purposes to be hereinafter described, a predetermined clearance 15 is hand cut in the stone around both sides of the replica a predetermined depth.

Figure 12:
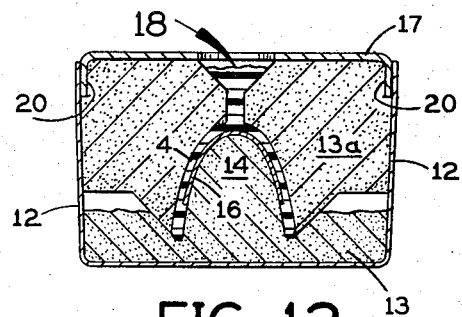
FIG. 12 is also a cross sectional view, taken through section line 10—10, FIG. 8, with the impression holder removed and the cope member of the mold or flask added and the molded cavity filled with liquid plastic material.
Figure 11:
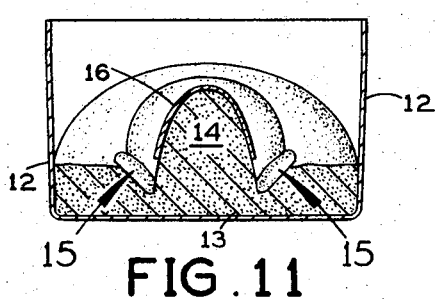
FIG. 11 is the same as FIG. 10 with the mold holder removed and the height of the core increased by hold tooling and the placement of a metal vacuum core.
Figure 13:
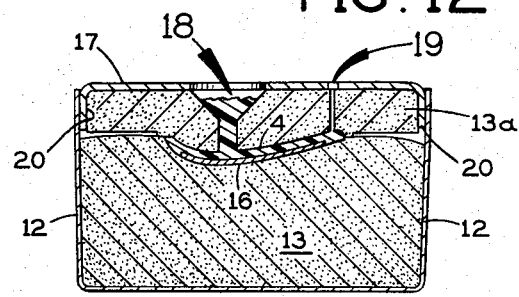
FIG. 13 is a side view like FIG. 9 following molding of the vacuum portion of the bridge.
Figure 14:
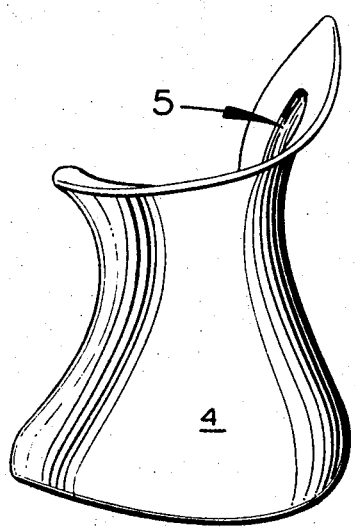
FIG. 14 is an enlarged perspective view of the vacuum portion of the bridge prepared for use.
Figure 15:
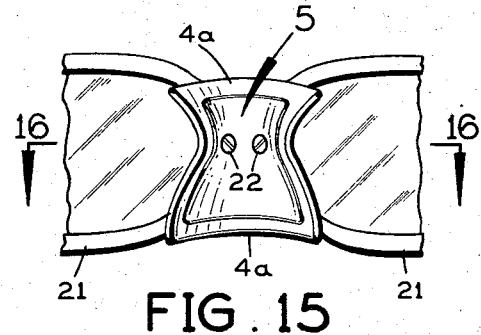
FIG. 15 is a fragmentary inside elevation of an alternate means for mounting the vacuum element on a plastic bridge of integral plastic framed spectacles.

A next important step is the preparation of a soft metal spacer 16, made from relatively thin sheet foil material of uniform thickness, such as an alloy of lead and tin, shaped over the replica 14, as shown in FIGS. 11, 12, and 13, which ultimately will mold the shallow recess 5, shown in FIGS. 14 and 15, leaving a marginal surface around the recess.

Following the hardening of the plaster 12 in the drag container 13, the drag portion of the molding flask is completed. A cope or upper flask container 16 is supplied with additional soft stone or plaster 12 and a cope pattern provided by well known techniques, corresponding to the outer shape of the holder 4 with slightly longer outer edges for engaging the opposite clearances 15 in the drag. The pattern may also include a riser for the entry 18, which may be manually tapered and also the vent 19. When the pattern is removed and the stone hardened and the cavity therein is registered precisely with the cavity in the drag, the mold is ready for the pouring operation.

A heated liquified plastic, such as an acrylic polymer, is poured into entry 18 for filling the space within the mold, thus casting the vacuum holder 4, shown in perspective in FIG. 14, after the sprues formed by elements 18 and 19 have been removed and the surfaces of the casting are polished, the vacuum holder is ready for use on each of several types of spectacles. A convenient method of securing the holder to plastic spectacles is shown in FIGS. 1–6 wherein the outer surface of the vacuum holder is cemented by compatible adhesive to the normal plastic bridge of the spectacles.

Figure 16:
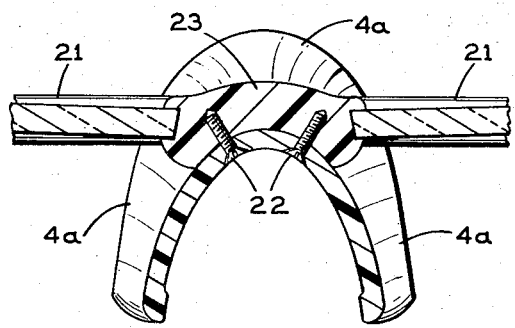
FIG. 16 is a top plan cross sectional view taken through section line 16—16, FIG. 15.

FIGS. 15 and 16 illustrate a pair of alternate spectacles 21 in which the vacuum holder 4a is retained to the bridge of the spectacles by a pair of flat-head counter-sunk screws 22, with FIG. 16 showing an enlarged view of the bridge structure 23 with the vacuum holder 4a secured by the screws 22, shown in FIG. 15, and threaded into the bridge 23.

It is also apparent that the holder 4 can be made of metal and serve as the bridge portion of spectacles by securing opposite sides thereof by well known means, such as soldering, brazing, or the use of metal fasteners to either the bridge or the metal rims of the spectacles.

It is to be understood that certain modifications in construction are intended to come within the scope and teachings of the above specification.

Having described my invention, I claim:

1. A holder for securing spectacles in proper position to the nose of a person comprising an arcuate shaped spectacle retaining member molded from plastic material with the inner side thereof precisely fitted to the contour of the upper portion of the nose of the said person including both sides thereof, a marginal smooth surface of predetermined width surrounding the entire inner said arcuate surface of said member forming a recess of uniform depth over the entire area within said margin, the outer surface of said member secured to the bridge of said spectacles whereby manual pressure against said bridge will evacuate the air from said area and permit the atmospheric pressure to hold said spectacles in said proper position, said retaining member constituting the sole support for said spectacles on said person.

2. The construction recited in claim 1 wherein the inside surface of the said spectacles has a plastic bridge shaped to be secured to said retaining member by a compatible adhesive.

3. The construction recited in claim 1 wherein the inside surface of each plastic rim of said spectacles is shaped to be secured to said retaining member by a compatible adhesive.

References Cited
UNITED STATES PATENTS

| | | |
|---|---|---|
| 2,234,729 | 3/1941 | Montalvo-Guenard 351—136 U X |
| 3,584,939 | 6/1971 | Olson _____ 351—136 X |
| 3,597,053 | 8/1971 | Mastman _____ 351—136 X |

DAVID SCHONBERG, Primary Examiner

J. W. LEONARD, Assistant Examiner

U.S. Cl. X.R.

264—222; 351—87, 132, 136, 178